(12) United States Patent
White

(10) Patent No.: US 7,988,175 B2
(45) Date of Patent: Aug. 2, 2011

(54) BICYCLE FRAME WITH STORAGE ELEMENT

(76) Inventor: Philip White, Toronto (CA)

( * ) Notice: Subject to any disclaimer, the term of this patent is extended or adjusted under 35 U.S.C. 154(b) by 14 days.

(21) Appl. No.: 12/585,748

(22) Filed: Sep. 23, 2009

(65) Prior Publication Data

US 2010/0090439 A1    Apr. 15, 2010

Related U.S. Application Data

(60) Provisional application No. 61/099,547, filed on Sep. 23, 2008, provisional application No. 61/136,679, filed on Sep. 24, 2008.

(51) Int. Cl.
     *B62K 3/02* (2006.01)
(52) U.S. Cl. .................. 280/281.1; 280/274; 280/288.3; 224/425; 224/426
(58) Field of Classification Search .............. 280/281.1, 280/274, 288.3; 224/425, 426
See application file for complete search history.

(56) References Cited

U.S. PATENT DOCUMENTS

| | | | |
|---|---|---|---|
| 4,667,881 A | 5/1987 | Michelotti | |
| 4,809,890 A | 3/1989 | Tsigadas | |
| 5,024,358 A * | 6/1991 | Reichert et al. ............... 224/414 |
| 5,158,218 A * | 10/1992 | Wery .............................. 222/610 |
| 5,201,442 A | 4/1993 | Bakalian | |
| 5,411,280 A * | 5/1995 | Allsop et al. ................ 280/281.1 |
| 5,607,087 A | 3/1997 | Wery et al. | |
| 5,788,134 A | 8/1998 | Matic, Jr. ....................... 224/414 |
| 5,823,557 A | 10/1998 | Penza .......................... 280/304.5 |
| 5,851,017 A * | 12/1998 | Eden .............................. 280/201 |
| 6,253,979 B1 | 7/2001 | Samson ........................ 224/426 |
| 6,401,997 B1 | 6/2002 | Smerdon, Jr. ................. 224/414 |
| 7,000,936 B2 | 2/2006 | Schmider | |
| 7,147,238 B2 * | 12/2006 | Oi ............................... 280/281.1 |
| 7,393,125 B1 | 7/2008 | Lai | |
| 7,819,413 B2 * | 10/2010 | White ......................... 280/281.1 |
| 2007/0278273 A1 | 12/2007 | Hollis | |
| 2008/0036171 A1 | 2/2008 | Vroomen | |
| 2009/0212526 A1 * | 8/2009 | Lin ............................. 280/281.1 |

FOREIGN PATENT DOCUMENTS

| | | |
|---|---|---|
| CA | 259 6987 | 2/2008 |
| CN | 2 705 380 Y | 6/2005 |
| DE | 9419269 | 2/1995 |
| EP | 0037275 | 10/1981 |
| EP | 0198284 | 10/1986 |
| EP | 1 886 906 A | 2/2008 |
| FR | 2332168 | 6/1977 |
| FR | 2550154 | 2/1985 |
| WO | WO 2007/143608 | 12/2007 |

* cited by examiner

*Primary Examiner* — Paul N Dickson
*Assistant Examiner* — Marlon A Arce

(57) ABSTRACT

The present invention relates to a storage element, preferably aerodynamic, designed for a bicycle frame, and more particularly a storage element designed in conjunction with the frame so as to increase the volume for storage proximate the frame.

20 Claims, 12 Drawing Sheets

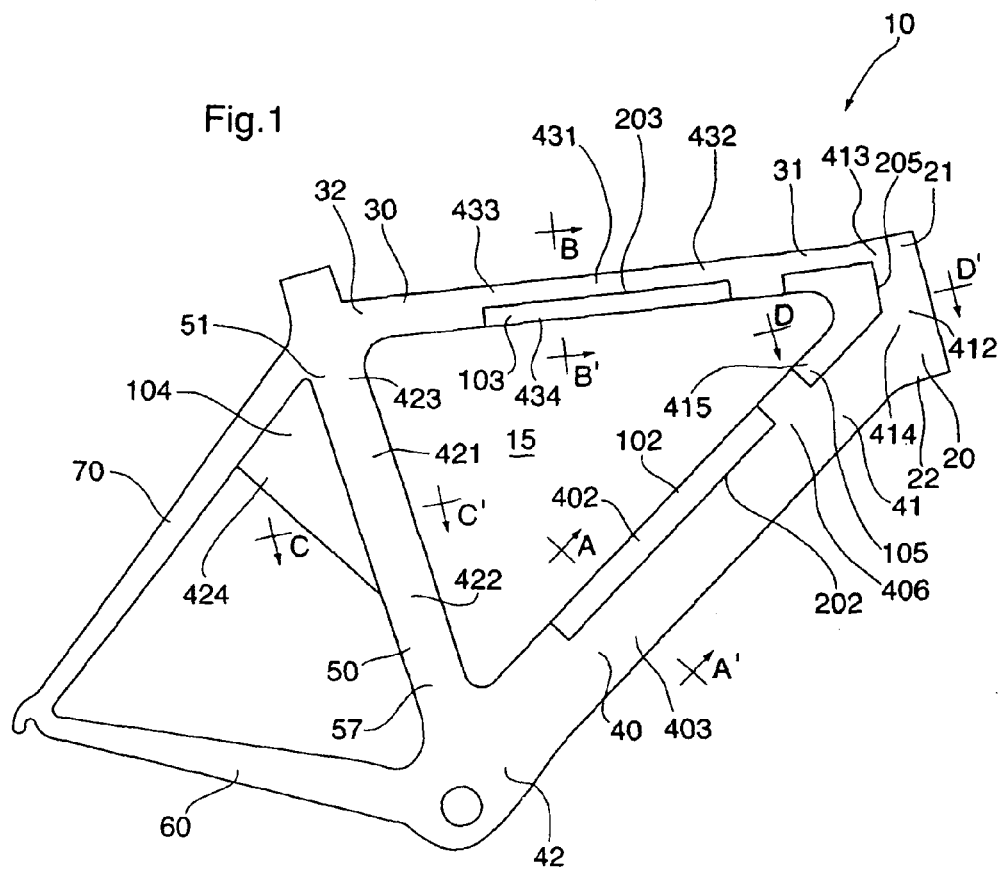
Fig.1
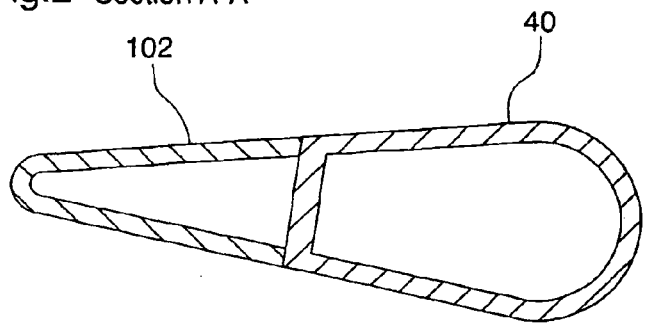
Fig.2 Section A-A'

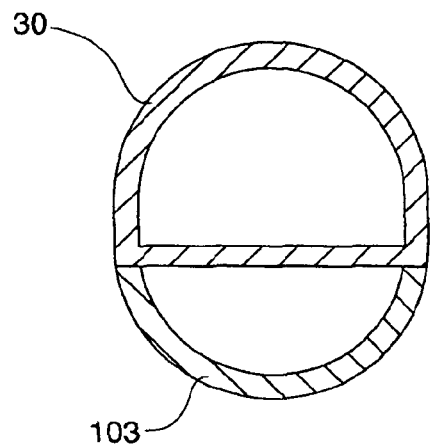
Fig.3 Section B-B'
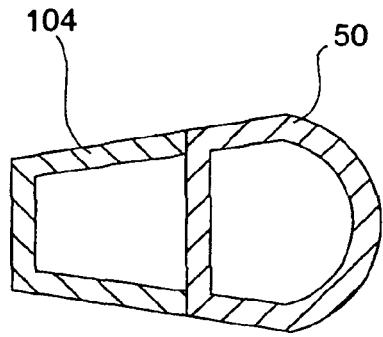
Fig.4 Section C-C'
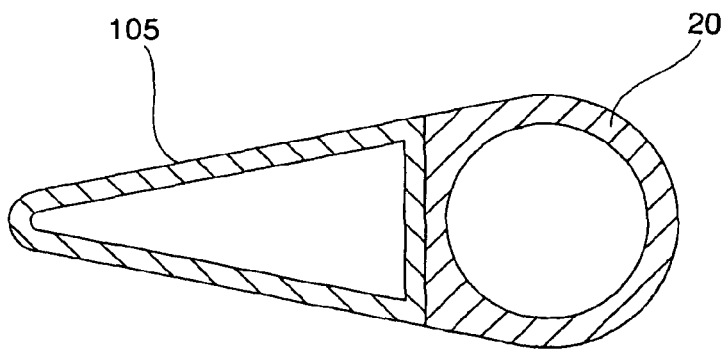
Fig.5 Section D-D'

Fig. 12
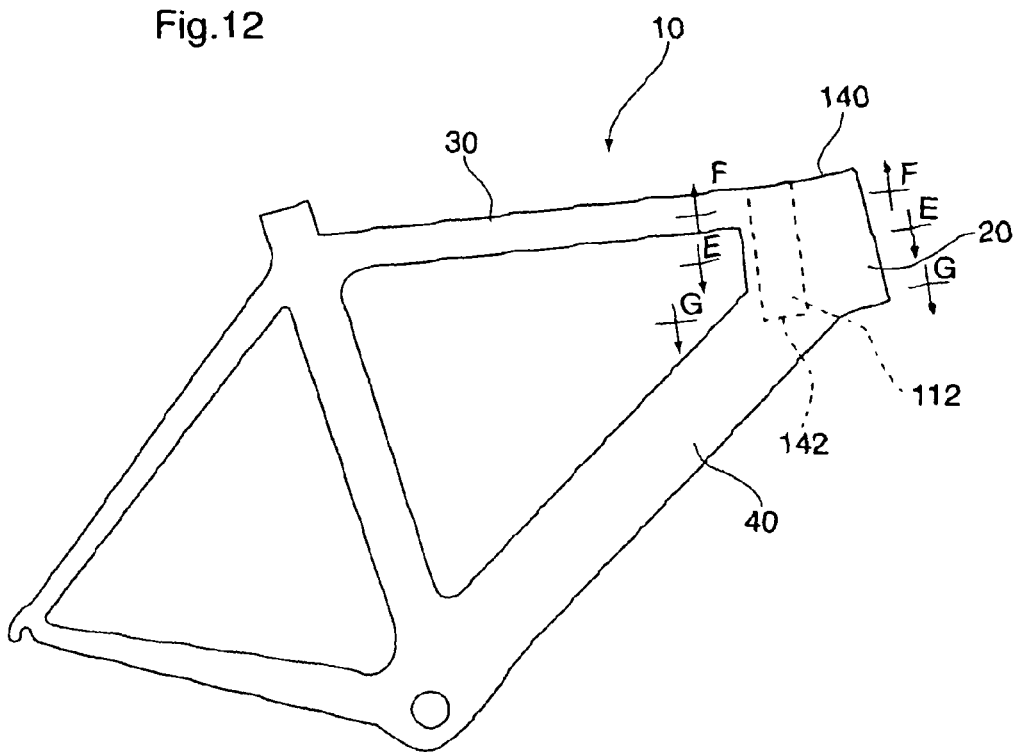
Fig. 13 Section E-E'
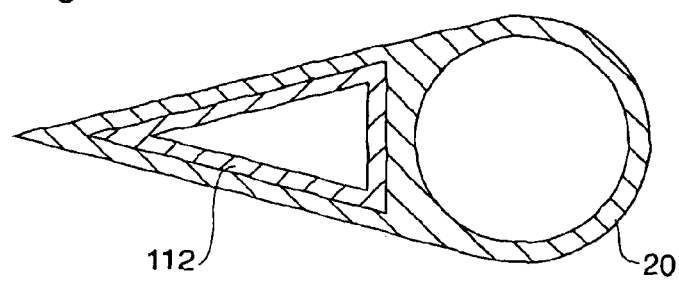

Fig. 14 Section F-F'
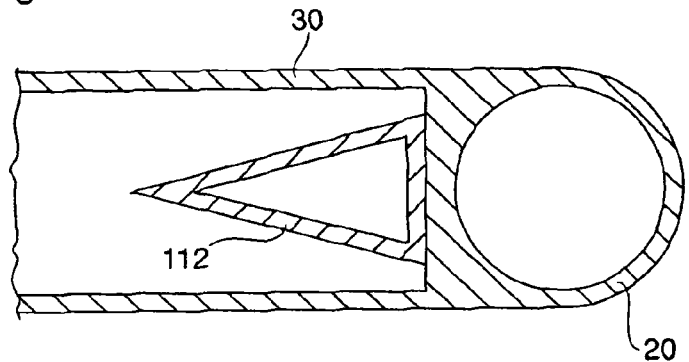
Fig. 15 Section G-G'
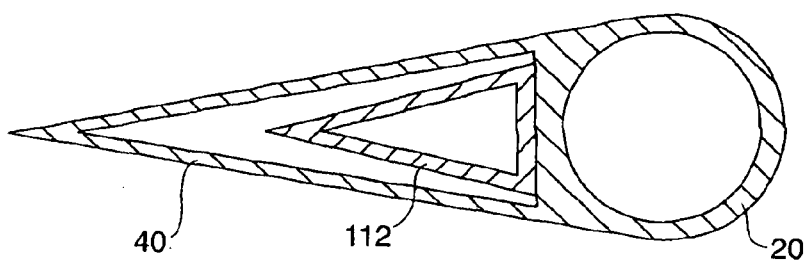
Fig. 16
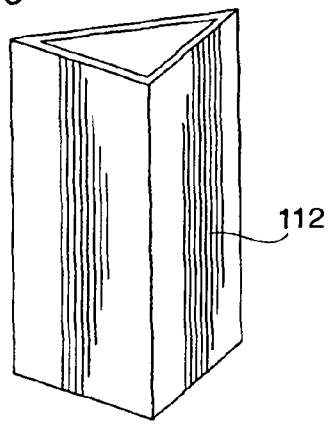

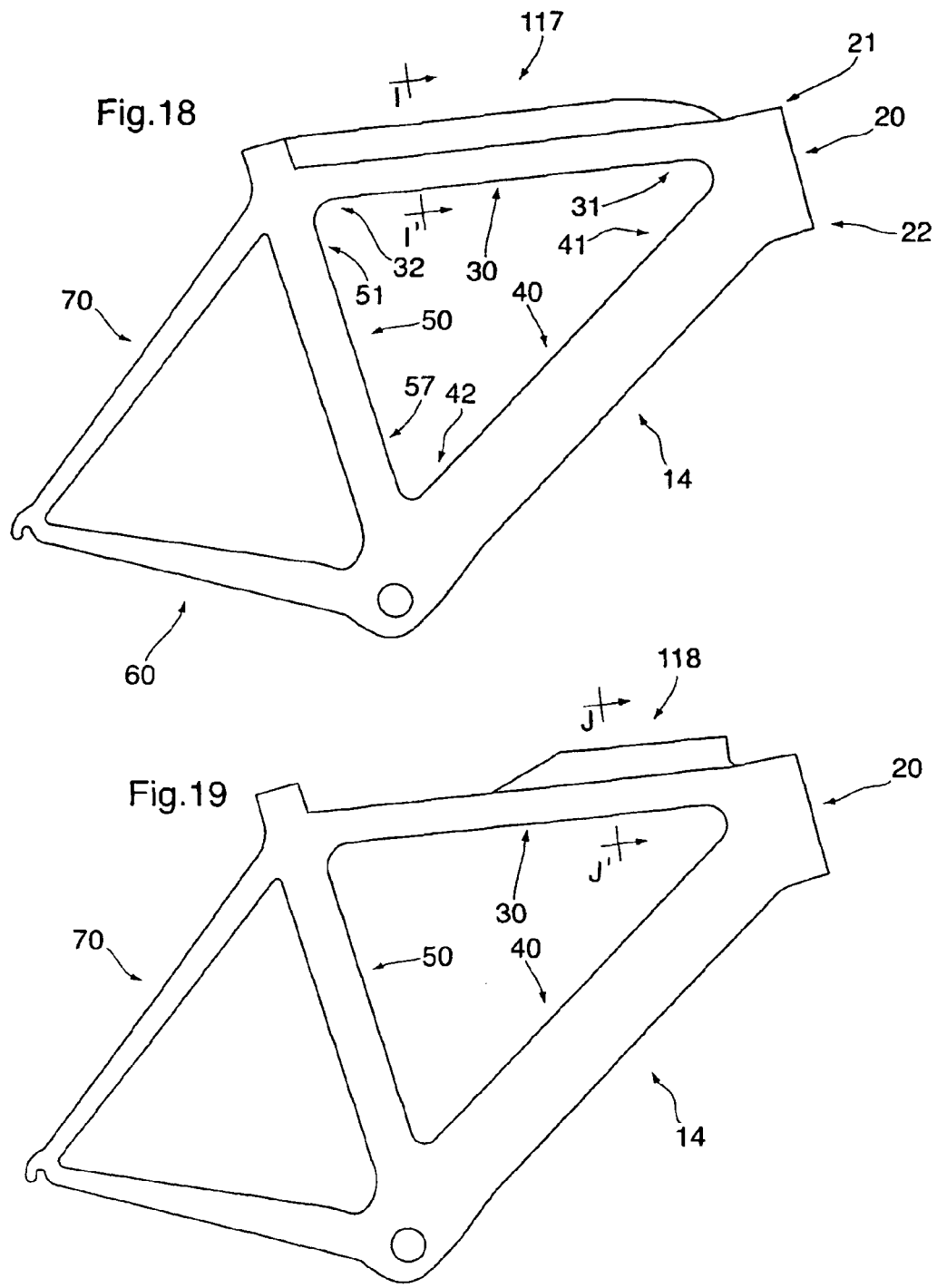

Fig.20 Section H-H'
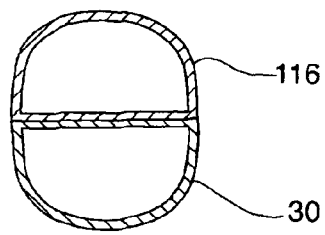
Fig.21 Section I-I'
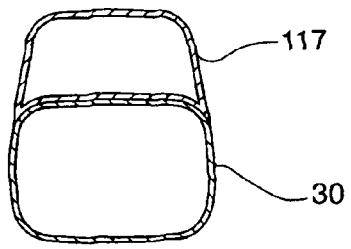
Fig.22 Section J-J'
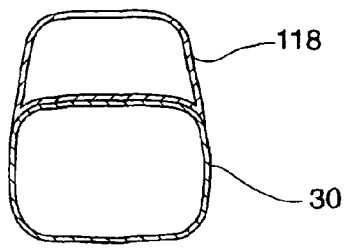
Fig.23
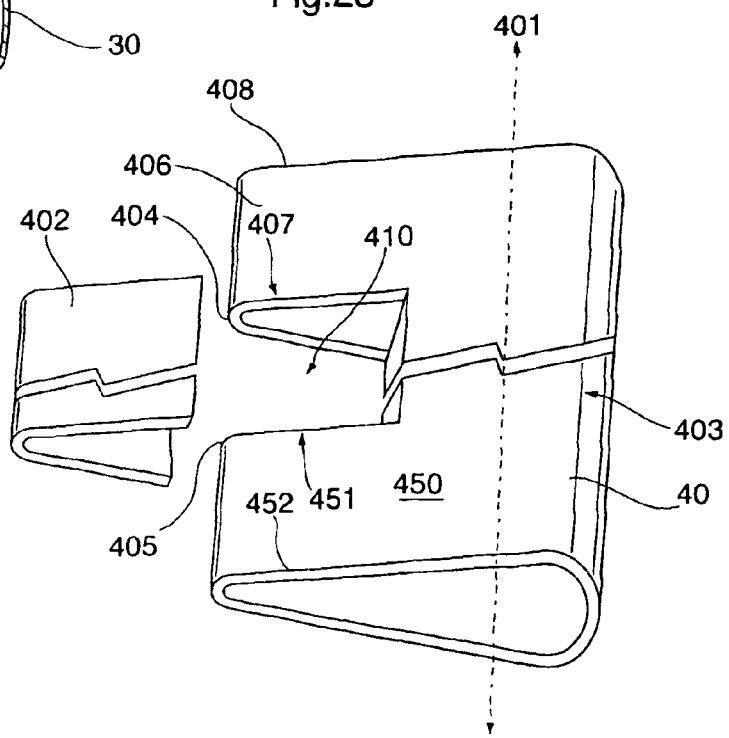

BICYCLE FRAME WITH STORAGE ELEMENT

This application claims as under 35 U.S.C. 119 of U.S. Provisional Patent Application Ser. No. 61/099,547 filed Sep. 23, 2008 and U.S. Provisional Patent Application Ser. No. 61/136,679 filed Sep. 24, 2008.

FIELD OF THE INVENTION

The present invention relates to a storage element, preferably aerodynamic, designed for a bicycle frame, and more particularly a storage element designed in conjunction with the frame so as to increase the volume for storage proximate the frame.

BACKGROUND OF THE INVENTION

The present applicant has appreciated that conventional bicycle frames and storage compartments do not utilize internal areas within the frame members for storage.

A conventional bicycle water bottle is mounted in a carrier attached to the down tube or seat tube of the frame. A conventional tool containing pouch is mounted to the frame behind the rider's seat. Typically, the water bottle or tool pouch profile extends well outside the envelope of the bicycle frame, when viewed head on, and thus adds to the frontal area of the bicycle increasing the aerodynamic drag on the bicycle. Further, the shape of the tool pouch or water bottle disturbs the air flowing across the bicycle frame members, thus further adding to the overall drag of the bicycle.

SUMMARY OF INVENTION

Accordingly, it is an object of the present invention at least to partially overcome the disadvantages of the prior art. Also, it is an object of the invention to provide an improved storage element for use with a bicycle frame to provide storage volumes internal and/or external to the frame members in order to increase storage capacity and/or reduce aerodynamic drag.

In the field of bicycle design and racing, aerodynamics plays an important role. Bicycles are now being designed to further reduce any aerodynamic drag to give the rider a further advantage over competitors or to improve their own times.

The present invention is directed to a storage element and bicycle frame that work in conjunction with each other. Bicycles made in the past have been designed in an aerodynamic fashion to reduce aerodynamic drag. As well, some storage elements, for example water bottles, have been designed to also be aerodynamic in shape. It is an object of the present invention to make both the frame and storage element complement each other so as to satisfy structural requirements of the frame yet allow for enhanced usage of volumes proximate the frame members for storage. Additionally the complementary arrangement of the frame and storage element, preferably are provided to be as aerodynamic as possible as with the storage element is designed to function as an integral aerodynamic element of the frame.

The aerodynamic shape of the bicycle frame in combination with the storage element may preferably be selected to be a shape that assists in reducing the aerodynamic drag when the bicycle moves forwardly through the air. Preferably, this may be an oval shape. Furthermore the oval shape may be a teardrop shape. A teardrop shape essentially has an enlarged rounded forward end and a reduced size at the rear end. Preferably the exterior surfaces of the tubes have a cross-section normal to the plane of the tubes which is a teardrop shape and the storage element is designed to fit within the teardrop shaped portions of the tubes, or to extend the tubes and form teardrop shapes in combination.

The storage element and frame may also be designed to facilitate the attachment of the storage element to the frame. The storage element may have concealed portions with complementary mating shapes to the concealed exterior portions of the exterior surface to a tube of the frame.

The storage element has an interior storage compartment. The interior storage compartment can be adapted to store any manner of items, including water, food, bicycle repair tools, collapsed inflatable bicycle tire replacement inner tubes, inner tube inflation devices, eyeglasses, goggles, clothing, maps, electronic equipment, computers, sensors, and other items.

The interior storage compartment can be configured to be accessible to the rider of the bicycle while the rider is riding the bicycle although it is not necessary, for example, when the compartment needs merely be accessible as when used for storing tools.

The storage element may also be or include a refillable container such as a water bottle for the storage of fluids for consumption by the rider. A drinking straw may be provided to allow the rider to drink from the storage element without removing the storage element from the frame itself.

In a further aspect, the present invention provides a bicycle frame comprising a plurality of structural elongate tubular members including a structural elongate first tubular member, the first tubular member extending about a longitudinal, the first tubular member having an elongate storage forming portion extending along the longitudinal from a first end of the storage forming portion to a second end of the storage forming portion, the first tubular member having an elongate first adjacent portion adjacent to the first end of the storage forming portion, the first adjacent portion extending along the longitudinal away from the storage forming portion from a first end of the first adjacent portion to a second end of the first adjacent portion, the storage forming portion at the first end of the storage forming portion merging into the first adjacent portion at the first end of the first adjacent portion, an exterior profile of the storage forming portion in cross section normal to the longitudinal being of reduced cross sectional area as compared to an exterior profile of first adjacent portion of the first tubular member in cross section normal to the longitudinal, a cover member removably coupled to the first tubular member over the storage forming portion and providing between the storage forming portion and the cover member a storage compartment, the combination of the storage forming portion with the cover member coupled thereto having an exterior profile in cross section normal to the longitudinal.

Preferably the exterior profile of the combination of the storage forming portion with the cover member coupled thereto smoothly merges with the exterior profile of the first adjacent portion of the first tubular member. Preferably the exterior profile of the combination of the storage forming portion with the cover member coupled thereto is a complementary shape in cross section normal to the longitudinal to a shape of the exterior profile of the first adjacent portion. Preferably the exterior profile of the combination of the storage forming portion with the cover member coupled having an average cross sectional area over its length as measured in cross section normal to the longitudinal thereto that is equal to or greater than the cross sectional area in cross section normal to the longitudinal of the exterior profile of the first adjacent portion Preferably the exterior profile of the first adjacent portion as seen in cross-sections normal the longitudinal along the longitudinal over the first adjacent portion has an exterior shape which is substantially unchanged or gradually changes along the longitudinal over the first adjacent portion, the exterior profile of the combination of the storage forming portion with the cover member coupled thereto has an exterior shape which is substantially the same as or gradually changes from the exterior shape of the first adjacent portion.

Preferably the cover member is coupled to the storage forming portion extending longitudinally thereon and centered between two lateral sides of the first tubular member. Preferably the tubular members are engaged end to end to form a loop, and the cover member is coupled to the storage forming portion on a side of the first tubular member selected from a side directed inwardly into the loop and a side directed outwardly from the loop. The first adjacent portion the storage forming portion may appear to have a laterally extending slot there through, which slot is covered by the cover member. The exterior profile of the first adjacent portion, as seen in cross-sections normal the longitudinal, may comprise a truncated form of the exterior profile of the storage forming portion as seen in cross-sections normal the longitudinal.

The exterior profile of the first adjacent portion as seen in cross-sections normal the longitudinal along the longitudinal over the first adjacent portion has an exterior shape which is oval, and the exterior profile of the combination of the storage forming portion with the cover member coupled thereto has an exterior shape which is oval. Preferably the oval shape is a teardrop shape having an enlarged rounded forward end and a reduced size rear end.

The structural elongate tubular members preferably include a down tube, a head tube, and seat tube; wherein the first tubular member is selected from the down tube, the head tube, and the seat tube, wherein: when the first tubular member is the head tube, the cover member is rearward from the head tube with the head tube forming a front portion of an oval shape and the cover forming a rear portion of the oval shape; when the first tubular member is the seat tube, and the cover member is either is forward from the seat tube or rearward from the seat tube; and when the first tubular member is the top tube, the cover member is either upward from the top tube or downward from the top tube.

Preferably first tubular member is the down tube, the cover member bridges between the down tube and seat tube, the down tube forms the a front portion of the oval shape, the seat tube forms a rear portion of the oval shape and the cover forms a middle portion of the oval shape.

Preferably the interior storage compartment comprises a refillable container for storage of fluids.

Preferably the first tubular member having an elongate second adjacent portion adjacent to the second end of the storage forming portion, the second adjacent portion extending along the longitudinal away from the storage forming portion from a first end of the second adjacent portion to a second end of the second adjacent portion, the storage forming portion at the second end of the storage forming portion merging along the longitudinal into the second adjacent portion at the first end of the second adjacent portion, an exterior profile of the storage forming portion in cross section normal to the longitudinal being of reduced cross sectional area as compared to an exterior profile of second adjacent portion of the first tubular member in cross section normal to the longitudinal.

Preferably the exterior profile of the combination of the storage forming portion with the cover member coupled thereto smoothly merging with the exterior profile of the second adjacent portion of the first tubular member. Preferably the exterior profile of the combination of the storage forming portion with the cover member coupled thereto is a complementary shape in cross section normal to the longitudinal to a shape of the exterior profile of the second adjacent portion.

Preferably the exterior profile of the combination of the storage forming portion with the cover member coupled has an average cross sectional area over its length as measured in cross section normal to the longitudinal thereto that is equal to or greater than the cross sectional area in cross section normal to the longitudinal of the exterior profile of the second adjacent portion.

Preferably the exterior profile of the second adjacent portion as seen in cross-sections normal the longitudinal along the longitudinal over the second adjacent portion has an exterior shape which is substantially unchanged or gradually changes along the longitudinal over the second adjacent portion, the exterior profile of the combination of the storage forming portion with the cover member coupled thereto has an exterior shape which is substantially the same as or gradually changes from the exterior shape of the second adjacent portion.

When coupled to the storage forming portion, the cover member has an exposed surface that is continuous with an exposed surface of the storage forming portion. The cover member when coupled to the storage forming portion, has an exposed surface that is continuous with both an exposed surface of the storage forming portion and an exposed surface of the first adjacent portion.

In a further embodiment, the present invention provides a bicycle frame comprising a plurality of elongate tubular members engaged end to end to form forming a loop, each tubular members extending along a respective longitudinal axis, each tubular members having oppositely directed sides comprising a right hand lateral side and a left hand lateral side and oppositely directed sides comprising inwardly directed side directed inwardly into the loop and an outwardly directed side directed outwardly from the loop a slot provided laterally through a first of the tubular members from the right hand lateral side to the left hand lateral side and open to one of the inwardly directed side and inwardly directed side, a cover member removably coupled to the first tubular member over the storage forming portion to define between the storage forming portion and the cover member a storage compartment.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention:

FIG. 1 is a side view of a bicycle frame in accordance with a first embodiment of the invention, FIGS. 2, 3, 4 and 5 is each a cross section of FIG. 1 along respective section lines A-A', B-B', C-C', and D-D' in FIG. 1, FIG. 12 is a side view of a bicycle frame in accordance with a fourth embodiment of the invention, FIGS. 13, 14, and 15 are each a cross section of FIG. 12 along respective section lines E-E', F-F' and G-G' in FIG. 12, FIG. 16 is a perspective view of the storage element in FIGS. 12, 13, 14 and 15.

FIG. 18 is a side view of a bicycle frame in accordance with a sixth embodiment of the invention, FIG. 19 is a side view of a bicycle frame in accordance with a seventh embodiment of the invention, FIG. 20 is a cross-section of FIG. 17 along section H-H' in FIG. 18, FIG. 21 is a cross-section of FIG. 18 along section I-I' in FIG. 18, FIG. 22 is a cross-section of FIG. 19 along section J-J' in FIG. 19, and FIG. 23 is an schematic exploded perspective view of a section of the down tube in FIG. 1 with an elongated section removed between the jagged lines for ease of illustration.

DETAILED DESCRIPTION OF THE PREFERRED EMBODIMENTS

Figure 6:
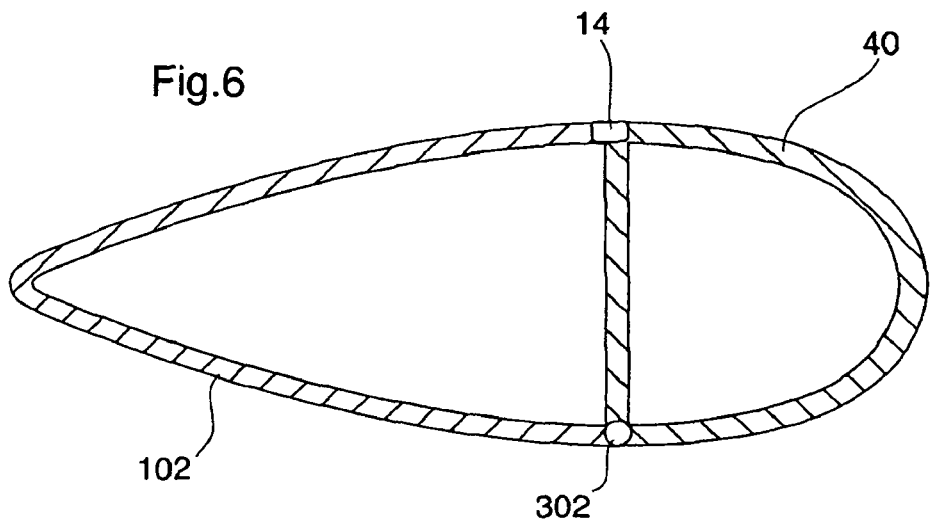
FIG. 6 is a cross section similar to FIG. 2 illustrating a first manner of attachment a storage element.

Preferred embodiments of the invention and its advantages can be understood by referring to the present drawings. Through all of the drawings the same reference numbers are used to refer to similar elements.

FIG. 1 is a side view of a bicycle frame 10 in accordance with a first embodiment of the invention. The frame 10 has a head tube 20, a top tube 30, a down tube 40 and a seat tube 50. The frame, as part of a bicycle when in normal use, moves in a forward direction where the head tube 20 and down tube 40 are forward of the seat tube 50. The top tube generally extends in forward direction. Each of the head tube 20, top tube 30, down tube 40 and seat tube 50 is connected end-to-end to one another and form substantially a closed main frame loop and a central cavity 15 as shown in FIG. 1. The central cavity 15 is the area enclosed by the main frame loop 14. Chain stays 60 extend rearwardly to join with seat stays 70 where a wheel not shown is to be journalled.

While not shown a fork is to be rotatably coupled to the head tube 20 to extend through the head tube carrying at an upper end the handlebars and at a lower end a front wheel. The head tube 20 has a top end 21 and a lower end 22. The top tube 30 has a front end 31 and a rear end 32. The down tube has a front end 41 and a rear end 42. The seat tube 50 has a top end 51 and a lower end 57.

The front end 31 of the top tube 30 is connected to the top end 21 of the head tube 20. The front end 41 of the down tube 40 is connected to the lower end 22 of the head tube 20. The top tube 30 and down tube 40 diverge away from each other as they extend rearwardly from the head tube 20. The rear end 42 of the down tube 40 is coupled to the lower end 57 of the seat tube 50. The rear end 32 of the top tube 30 is connected to the top end 51 of the seat tube 51.

Each of the head tube 20, top tube 30, down tube 40 and seat tube 50 are elongate members disposed about their own longitudinal axis. The longitudinal axis of each of the head tube 20, top tube 30, down tube 40 and seat tube 50 lie in their own respective flat plane, which is parallel to the forward direction of travel of the bicycle frame. In a further embodiment, the longitudinal axis of each of the head tube 20, top tube 30, down tube 40 and seat tube 50 lie in the same flat central plane.

Each of the head tube 20, top tube 30, down tube 40 and seat tube 50 have a circumferential wall about their longitudinal axis, each point along the length of each of the longitudinal axis and parallel to the central plane.

Each of the head tube 20, top tube 30, down tube 40 and seat tube 50 are preferably generally symmetrical about the central plane. Each of these tubes preferably has an annular tubular wall with an external surface which is symmetrical about the central plane. Each of these tubes 20, 30, 40 and 50 has inwardly directed portions of its exterior surface facing the central cavity 15 within the mainframe loop.

FIG. 1 is a preferred first embodiment of the frame 10 schematically showing four different storage elements 102, 103, 104, and 105 at four different locations on the frame. Storage element 102 is provided in a slot-like cavity 202 formed in the upper rear of the down tube 40. As seen in FIG. 2 the down tube 40 in the cavity 202 has a cross section which is but the forward portion of a teardrop shape and the storage element 102 is provided rearwardly of the down tube 40 to complete the teardrop shape. Above and below the cavity 202 the down tube 40 has a cross section corresponding to the exterior profile of both the down tube 40 and the storage element 102 shown in FIG. 2.

Storage element 103 is provided in a slot-like cavity 203 formed in the lower portion of the top tube 30. As seen in FIG. 3, the top tube 30 in the cavity 203 has a cross section which is but the upper end portion of an oval shape and the storage element 103 is provided below the top tube 30 to complete the oval shape. Forward and rearward of the cavity 203, the top tube 30 has a cross section corresponding to the exterior profile of both the top tube 30 and the storage element 103 shown in FIG. 3.

Seat tube 50 is shown in cross section in FIG. 4 with the forward portion of a teardrop shape having a flat rear surface with the storage element 104 provided rearwardly of the seat tube 50 to complete the teardrop shape. Below the storage element 104 the seat tube 50 has a teardrop shape proportional to but tapered down, that is reduced in front to rear dimension from the exterior profile of both the seat tube 50 and the storage element 104 shown in FIG. 4.

Storage element 105 is provided in a slot-like cavity 205 formed in the rear of the head tube 20. As seen in FIG. 5 the head tube 20 in the cavity 205 has a cross section which is but the forward portion of a teardrop shape and the storage element 105 is provided rearwardly of the head tube 20 to complete the teardrop shape.

Figure 7:
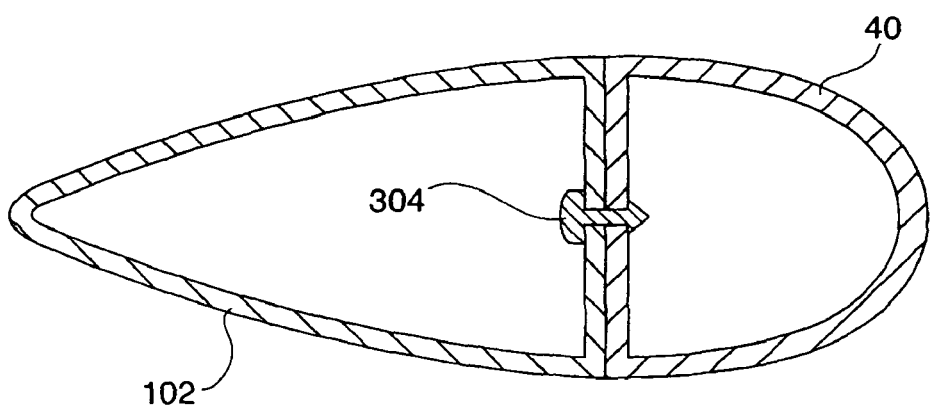
FIG. 7 is a cross section similar to FIG. 6 illustrating a second manner of attachment a storage element.

The storage elements and frame tubes shown in FIGS. 1 to 5, as well as FIGS. 7 to 8 and 12 to 15 are schematically shown for simplicity of illustration principally by their own exterior surfaces indicating that the tubes are hollow members and that the storage elements provide internal storage compartments or cavities either alone or in combination with external surfaces of the tubes. As seen in FIGS. 2, 3, 4 and 6, each storage element is effectively a C-shaped cover, which encloses a storage volume closed on one side by an associated tube. As seen in FIGS. 5 and 7, the storage element is a hollow tube.

FIG. 6 schematically illustrates the storage element 102 coupled to the down tube 40 by a hinge 302 on one side to be movable from a closed position shown to an open position and with a latch or releasable closure element 14 on the other side to secure the storage element 102 in the closed position. In this embodiment the storage element may be considered a hollow cover defining a cavity under the cover rearward of the rear surface of the down tube 40.

FIG. 7 schematically illustrates the storage element 102 coupled to the down tube 40 by a friction fit barbed fastener 304 to extend into an opening into the wall of the down tube 40. In this embodiment the storage element may be considered a hollow tubular member with an interior cavity and some access to the cavity which may be a separate door or cover carried for example on the storage element 102 but not shown.

Figure 8:
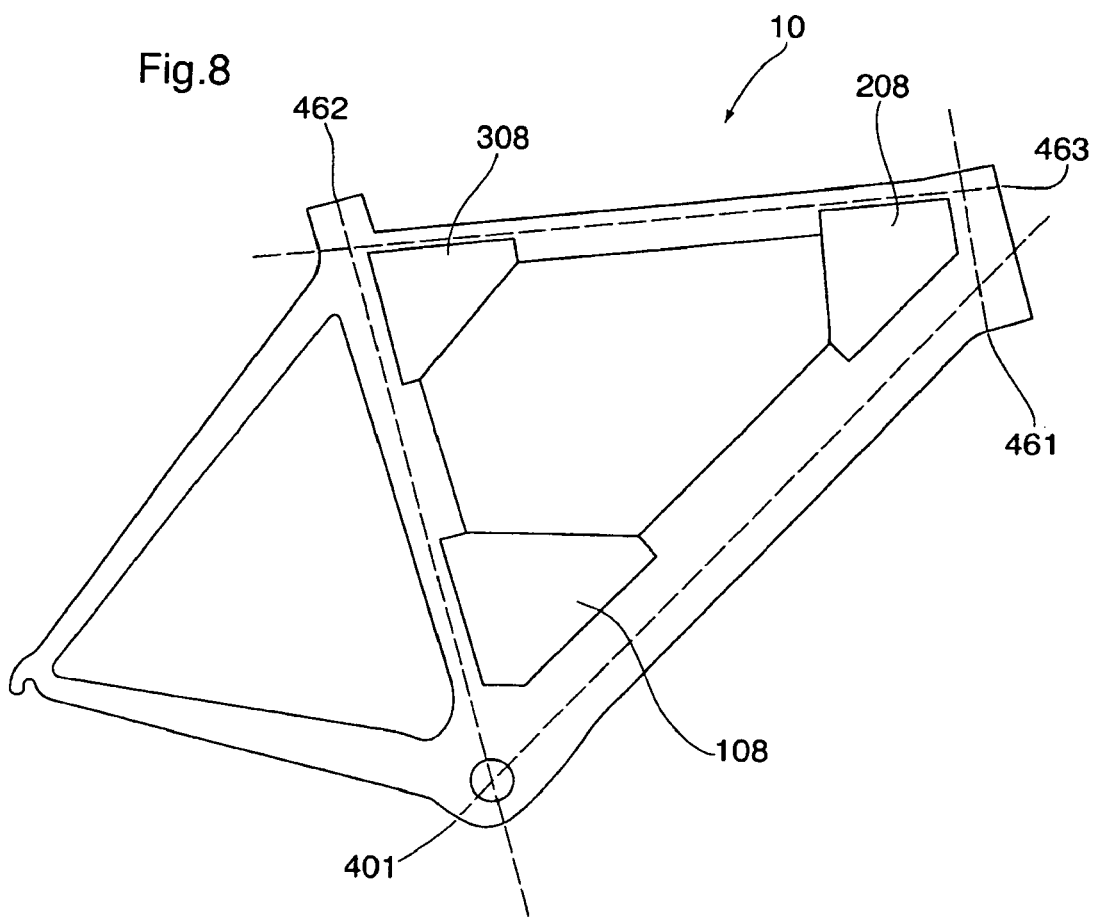
FIG. 8 is a side view of a bicycle frame in accordance with a second embodiment of the invention.

FIG. 8 is a side view of a bicycle frame in accordance with a second embodiment of the invention and schematically showing three different storage elements 108, 208, and 308 each located at a junction of two or more of the tubes of the frame 10 and the storage element at each junction may be have as part of its interior cavity volumes where the tubes are reduced in cross section as compared to cross sections of the same tubes longitudinally spaced from the storage element.

Figure 9:
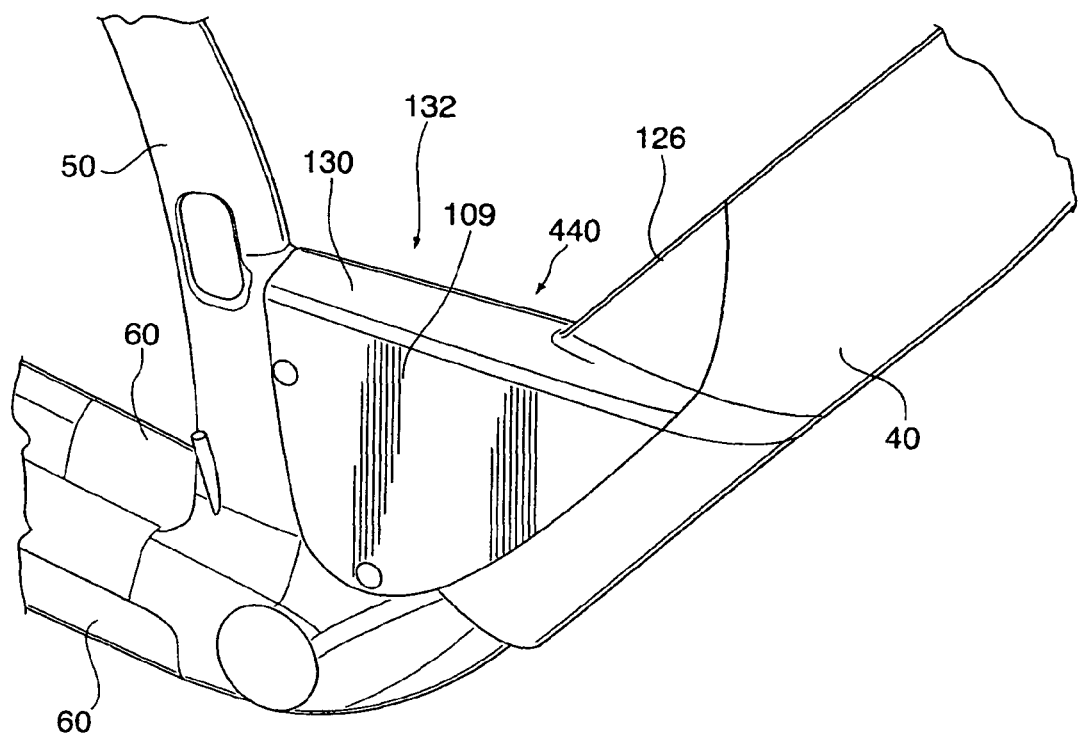
FIG. 9 is a schematic partial pictorial side view of a lower portion of a bicycle frame in accordance with a third embodiment of the invention showing a storage element coupled thereto.

FIG. 9 illustrates a schematic partial pictorial side view of a lower portion of a bicycle frame in accordance with a third embodiment of the invention, showing the lower portions of the down tube 40 and the seat tube 50 as well as a forward portion of the chain stays 60. A storage element 109 is shown at the junction of the down tube 40 and the seat tube 50 as a preferred embodiment of a storage element more generically shown as 108 in FIG. 8.

Figure 10:
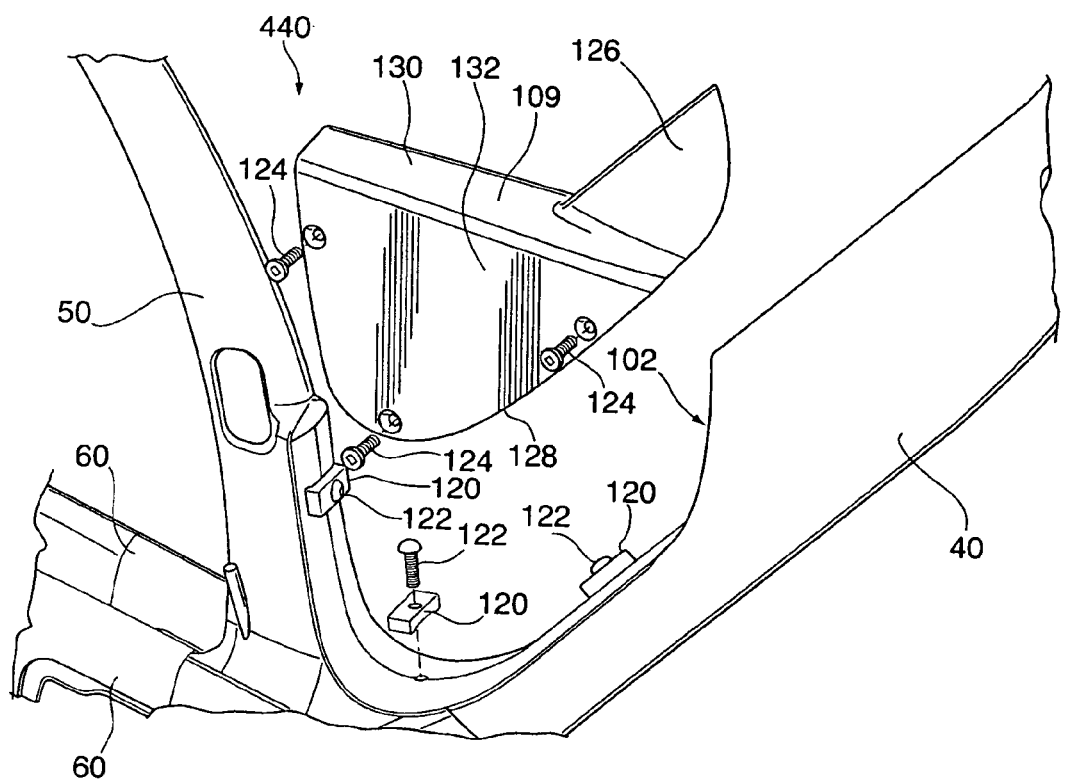
FIG. 10 is an exploded schematic partial pictorial side view of the embodiment shown in FIG. 9.
Figure 11:
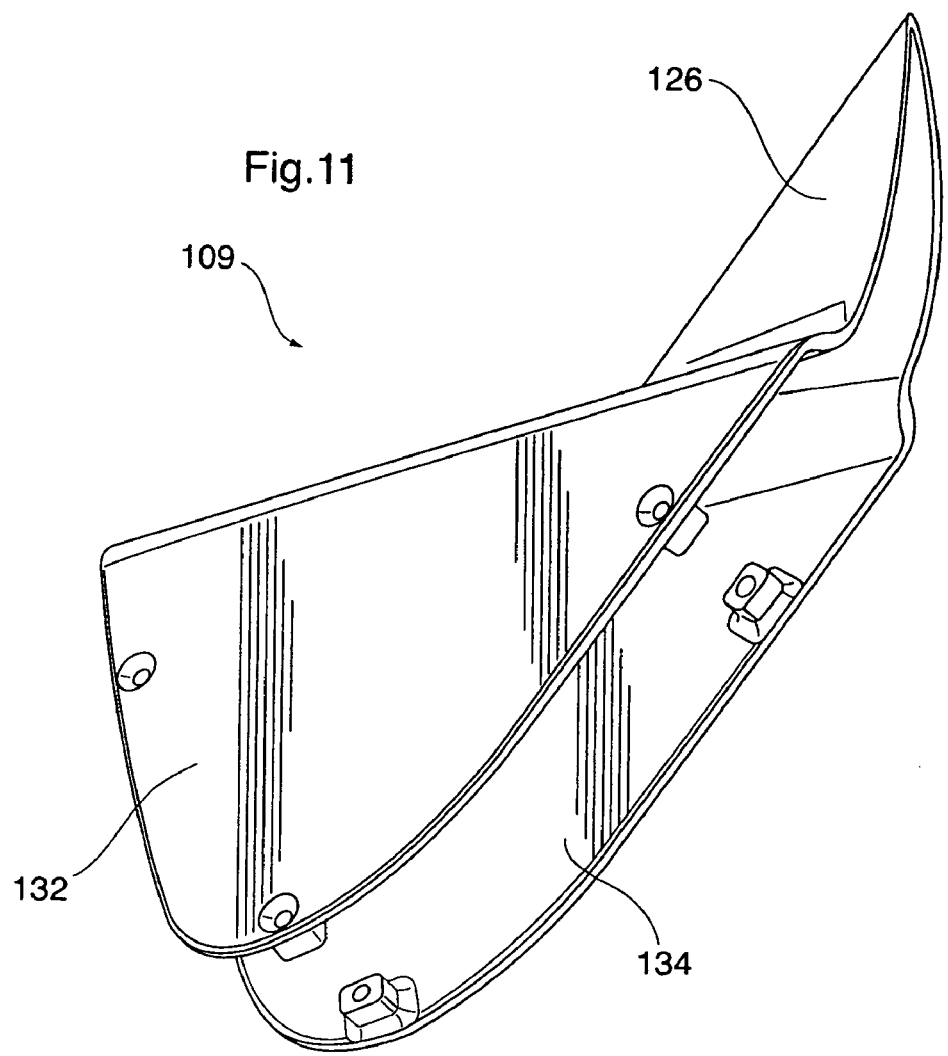
FIG. 11 is a pictorial side view of the storage element shown in FIG. 9.

The storage element 109 in FIGS. 9 to 11 comprises a hollow shroud or cover which is adapted to enclose the junction of the down tube 40 and the seat tube 50. Support plugs 120 are mounted to interior surfaces of the seat tube and down tube by screws 122 and the storage element 109 is removably mounted to these plugs 120 by attachment screws 124 extending laterally through edge portions of the storage element 109 into ends of the plugs 120.

The down tube 40 has a slot-like cavity 102 formed in its upper rear proximate its juncture with the seat tube 50. The down tube 40 above the slot-like cavity 102 has in cross section a teardrop shape directed forwardly. In cross section through the slot-like cavity 102 the down tube 40 approximately has a cross section which is but the forward portion of a teardrop shape. The storage element 109 has an upper most portion 126 which is a complementary rear portion to fill in the upper portion of the slot-like cavity 102 and with juxtapositioned portions of the down tube 40 providing in combination an external teardrop shape. Below the upper most portion 126 the storage element 109 is effectively a U-shaped rear portion 128 with a relatively flat top wall 130 and two downwardly extending side walls 132 and 134. The periphery of the side walls 132 and 134 are adapted to mate in a flush relation with side wall portions of the seat tube and down tube in a flush arrangement as seen in FIG. 9. A storage compartment is provided internally within the storage element 109 and between the storage element and the seat tube and the down tube. The storage element 109 may be a structural member increasing the strength and integrity of the frame 10, or it may comprise merely a decorative cover.

FIG. 12 is a side view of a bicycle frame in accordance with a fourth embodiment of the invention and showing a storage element 112 formed internally within the frame 10 open through the top of the top tube 30 and extending down through the top tube 30, down through a rear portion of the head tube 20 rearwardly of the journal opening 140 to receive the steering tube (not shown), and down into the down tube 40, ending internally in the upper rear of down tube 40 at a blind lower end 142. FIG. 16 shows the storage element 112 as a hollow upwardly directed cup, suitable to receive articles in its upwardly opening end, as for example adapted to receive a water bottle. The cup could have a closable lid accessible from above the top tube 20.

As seen in FIG. 13, which is a cross-section along E-E' in FIG. 12, the head tube 20 has an exterior tear drop shape. The volume is located at the rear portion of the head tube and is adapted to accept the storage element 114.

As seen in FIG. 14, which is a cross-section along F-F' in FIG. 12, the storage element 114 is located within the top tube 30.

As seen in FIG. 15, which is a cross-section along G-G' in FIG. 12, the storage element extends through the volume in the down tube 40.

FIG. 16 is a perspective view of the storage element in FIGS. 12, 13, 14 and 15.

Figure 17:
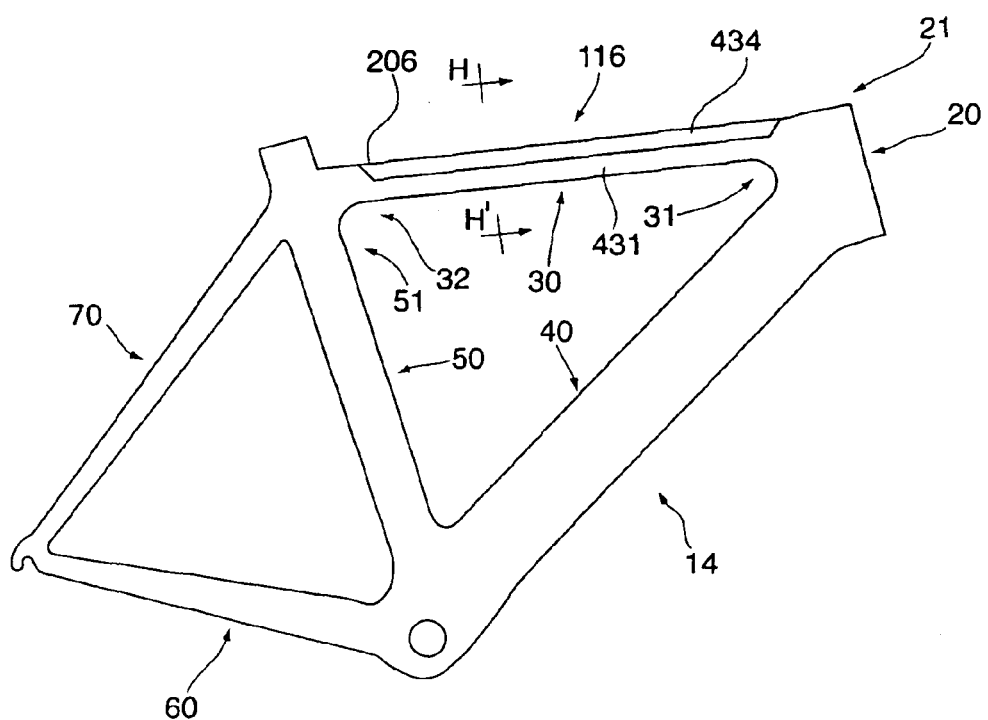
FIG. 17 is a side view of a bicycle frame in accordance with a fifth embodiment of the invention.

FIG. 17 is a side view of a bicycle frame in accordance with a fifth embodiment of the invention and showing a storage element 116 formed in the upper portion of the top tube 30.

Storage element 116 is provided in a slot-like cavity 206 formed in the upper portion of the top tube 30. As seen in FIG. 20, the top tube 30 has a cross-section which is the lower end portion of an oval shape. Forward and rearward of the cavity 206, the top tube has an oval shape in cross-section corresponding to the exterior profile of both the top tube 30 and storage element 116 shown in FIG. 20.

FIG. 18 is a side view of a bicycle frame in accordance with a sixth embodiment of the invention and showing a storage element 117 attached on the upper portion of the top tube 30. As seen in FIG. 21, the top tube 30 has a cross-section which is roughly rectangular with curved corners. The storage element 117 has a bottom portion 119 which corresponds to the upper portion 120 of the top tube 30. The top tube 30 and the storage element 117, together form an oval shape.

FIG. 19 is a side view of a bicycle frame in accordance with a seventh embodiment of the invention and showing a storage element 118 attached to the upper portion of the top tube 30. As shown in FIG. 19, the storage element 118 is substantially placed at the front end 31 of the top tube 30. The storage element 118 has in cross-section indicated as J-J' in FIG. 22 the same cross-section as seen in FIG. 21, that is with the storage element 118 is designed to complement top tube 30 to form a substantially oval shape.

The storage elements may be secured to the frames permanently or for removal. For example, any one or more of the storage elements may be held in place on the frame 10 by a number of non-permanent fastening methods, for example, with complementary mating shapes on the storage element and on the frame 10.

The disclosure can also be understood to teach that at least one of the head tube 20, down tube 40, seat tube 50 and top tube 30 of a bicycle frame 10 has a portion with a reduced cross-section rather than being referred to as a slot-like cavity 102, 202, 203, 205 and 206.

As shown in FIGS. 1 and 23, bicycle frame 10 includes a down tube 40 that is an elongate tubular member. The down tube 40 extends about a longitudinal 401. The down tube 40 has an elongate storage forming portion 403 extending along the longitudinal 401 from a first end 404 of the storage forming portion to a second end 405 of the storage forming portion.

The down tube 40 also has an elongate first adjacent portion 406 adjacent to the first end 404 of the storage forming portion. The first adjacent portion 406 extends along the longitudinal 401 away from the storage forming portion 403 from a first end 407 of the first adjacent portion to a second end 408 of the first adjacent portion.

The storage forming portion 403 at the first end 404 of the storage forming portion merges into the first adjacent portion 406 at the first end 407 of the first adjacent portion.

As shown in FIG. 23, an exterior profile of the storage forming portion 403 in cross section normal to the longitudinal has a reduced cross sectional area as compared to an exterior profile of first adjacent portion 406 of the down tube 10 in cross section normal to the longitudinal.

A cover member 402 is removably coupled to the down tube 10 over the storage forming portion 403. A storage compartment is created between the storage forming portion 403 and the cover member 402.

When the storage forming portion 403 is coupled with the cover member 402, the two have an exterior profile in cross section normal to the longitudinal.

As shown in FIG. 1, when the cover member 402 is coupled to the down tube 40 at the storage forming portion 403, the exterior profile of the combination of the storage forming portion 403 with the cover member 402 smoothly merges with the exterior profile of the first adjacent portion 406 of the down tube 40.

As shown in FIG. 1, the exterior profile of the combination of the storage forming portion 403 with the cover member 402 when coupled is a complementary shape in cross section normal to the longitudinal to a shape of the exterior profile of the first adjacent portion 406.

As shown in FIGS. 1, 18 and 23, the exterior profile of the combination of the storage forming portion 403 with the cover member 402 coupled has an average cross sectional area over its length as measured in cross section normal to the longitudinal that is equal to (FIG. 1) or greater than (FIG. 18) the cross sectional area in cross section normal to the longitudinal of the exterior profile of the first adjacent portion 406.

As shown in FIGS. 1 and 23, the exterior profile of the first adjacent portion 406 as seen in cross-sections normal the longitudinal along the longitudinal over the first adjacent portion 406 has an exterior shape which is substantially unchanged or gradually changes along the longitudinal over the first adjacent portion 406.

As shown in FIGS. 1, 9 and 23, the exterior profile of the combination of the storage forming portion 403 and the cover member 402 when coupled has an exterior shape which is substantially the same as or gradually changes from the exterior shape of the first adjacent portion 406.

As shown in FIGS. 1 and 23, the cover member 402 is coupled to the storage forming portion 403 and extends longitudinally and is centered between two lateral sides of the down tube 40.

As shown in FIGS. 1 and 17, the down tube 40, seat tube 50, top tube 30 and head tube 20 are engaged end to end to form a loop. The cover member 402 is coupled to the storage forming portion 403 on a side of the down tube 40 selected from a side directed inwardly into the loop (FIG. 1) and a side directed outwardly from the loop (FIG. 17).

As shown in FIG. 23, the storage forming portion 403, when compared to the first adjacent portion 406, appears to have a laterally extending slot 410 through the storage forming portion 403, which slot 410 is covered by the cover member 402.

As shown in FIGS. 9 and 23, the exterior profile of the down tube 40 as seen in cross-sections normal the longitudinal comprises a truncated form of the exterior profile of the storage forming portion 403 as seen in cross-sections normal the longitudinal.

As shown in FIG. 23, the exterior profile of the down tube 40 as seen in cross-sections normal the longitudinal along the longitudinal 401 over the first adjacent portion 406 has an exterior shape which is oval.

As shown in FIGS. 2 and 23, the exterior profile of the combination of the storage forming portion 403 when the cover member 402 is coupled has an exterior shape which is oval.

As shown in FIGS. 2 and 23, the oval shape is a teardrop shape having an enlarged rounded forward end and a reduced size rear end.

As shown in FIGS. 8, 9 and 10, the cover member 440 may bridge between the down tube 40 and seat tube 50 with the down tube 40 forming a front portion of the oval shape, the seat tube 50 forming a rear portion of the oval shape and the cover forming a middle portion of the oval shape.

The interior storage compartment may comprise a refillable container for storage of fluids.

As shown in FIGS. 1 and 23, the down tube 40 has an elongate second adjacent portion 450 adjacent to the second end 405 of the storage forming portion 403. The second adjacent portion 450 has a first end 451 of the second adjacent portion and a second end 452 of the second adjacent portion. The second adjacent portion 450 extends along the longitudinal 401 away from the storage forming portion 403 from the first end 451 of the second adjacent portion to the second end 452 of the second adjacent portion.

The storage forming portion 403 at the second end 405 of the storage forming portion merges along the longitudinal 401 into the second adjacent portion 450 at the first end 451 of the second adjacent portion.

An exterior profile of the storage forming portion 403 in cross section normal to the longitudinal is of reduced cross sectional area as compared to an exterior profile of second adjacent portion 450 of the down tube 40 in cross section normal to the longitudinal.

As shown in FIGS. 1 and 23, the exterior profile of the combination of the storage forming portion 403 and the cover member 402 when coupled smoothly merges with the exterior profile of the second adjacent portion 450 of the down tube 40.

As shown in FIGS. 1 and 23, the exterior profile of the combination of the storage forming portion 403 and the cover member 402 when coupled is a complementary shape in cross section normal to the longitudinal to a shape of the exterior profile of the second adjacent portion 450.

As shown in FIGS. 1 and 23, the exterior profile of the combination of the storage forming portion 403 and the cover member 402 when coupled has an average cross sectional area over its length as measured in cross section normal to the longitudinal that is equal to or greater than the cross sectional area in cross section normal to the longitudinal of the exterior profile of the second adjacent portion 450.

As shown in FIGS. 1 and 23, the exterior profile of the second adjacent portion 450 as seen in cross-sections normal the longitudinal along the longitudinal 401 over the second adjacent portion 450 has an exterior shape which is substantially unchanged or gradually changes along the longitudinal 401 over the second adjacent portion 450.

The exterior profile of the combination of the storage forming portion 403 and the cover member 402 when coupled has an exterior shape that is substantially the same as or gradually changes from the exterior shape of the second adjacent portion 450.

As shown in FIGS. 1 and 23, when the cover member 402 is coupled to the storage forming portion 403, the cover member 402 has an exposed surface that is continuous with an exposed surface of the storage forming portion 402.

As shown in FIGS. 1 and 23, when the cover member 402 is coupled to the storage forming portion 403, the cover member 402 has an exposed surface that is continuous with both an exposed surface of the storage forming portion 403 and an exposed surface of the first adjacent portion 406.

As shown in FIG. 1, the bicycle frame includes a plurality of elongate tubular members, including the head tube 20, down tube 40, seat tube 50 and top tube 30, engaged end to end to form forming a loop.

As shown in FIGS. 1 and 5, the structural elongate tubular members of the bicycle frame 10 include the down tube 40, the top tube 30, the head tube 20, and the seat tube 50. It is understood that the head tube 20 may have an elongate storage portion 412 with a first end 413 and second end 414 as described above for the down tube 40. When the head tube 20 has the elongate storage portion 412, the cover member 415 is rearward from the head tube 20 with the head tube 20 forming a front portion of an oval shape and the cover forming a rear portion of the oval shape.

The cover member 415 may bridge between the down tube 40 and top tube 30, with the head tube 20 and down tube 40 forming the front portion of the oval shape and the cover 415 forming the rear portion of the oval shape.

As shown is FIGS. 1 and 4, it is understood that the seat tube 50 may have an elongate storage portion 421 with a first end 422 and second end 423 as described above for the down tube 40. When the first tubular member is the seat tube 50, the cover member 424 is either is forward from the seat tube 50 or rearward from the seat tube 50.

As shown in FIGS. 1, 3, 17 and 20, it is understood that the top tube 30 may have an elongate storage portion 431 with a first end 432 and second end 433 as described above for the down tube 40. When the first tubular member is the top tube 30, the cover member 434 is either upward from the top tube 30 (FIG. 1) or downward from the top tube 30 (FIG. 17).

The embodiment expressed above is described with respect to a down tube 40 having a storage forming portion 403, a first adjacent side 406 with a first end 407 and a second end 408 and a second adjacent side 450 with a first end 451 and a second end 452. However, each of the seat tube 50, top tube 30 and head tube 20 can each have a storage forming portion and a first adjacent side with a first end and a second end. Each of the seat tube 50, top tube 30 and head tube 20 may also have a second adjacent side with a first end and a second end.

Each of the head tube 20, down tube 40, seat tube 50 and top tube 30 extends along a respective longitudinal axis and has oppositely directed sides comprising a right hand lateral side and a left hand lateral side. The head tube 20, down tube 40, seat tube 50 and top tube 30 also have oppositely directed sides comprising inwardly directed side directed inwardly into the loop and an outwardly directed side directed outwardly from the loop.

A slot (102, 202, 203, 205, 206) is provided laterally through one of the head tube 20, down tube 40, seat tube 50 and top tube 30 from the right hand lateral side to the left hand lateral side and open to one of the inwardly directed side and inwardly directed side. A cover member 415, 402, 424, 434 is removably coupled to the one of the head tube, down tube, seat tube and top tube over the storage forming portion 412, 403, 421, 431 to define between the storage forming portion 412, 403, 421, 431 and the cover member 415, 402, 424, 434 a storage compartment.

While the storage forming portion 403 in FIG. 23 is shown as having a solid wall, it is understood that in particular embodiments a solid wall is not necessary. Furthermore, while the first end of the first adjacent portion in FIG. 23 is shown as being open to the interior of the down tube 40, it is understood that the first end 407 of the first adjacent portion and the first end 451 of the second adjacent portion may be open to the interior of the down tube 40 or may be a solid wall closed to the interior of the down tube 40.

While the invention will be described in conjunction with the illustrated embodiments, it is understood that it is not intended to limit the invention to such embodiments. On the contrary, it is intended to cover all alternatives, modifications and equivalents as may be included within the spirit and scope of the invention.

The invention claimed is:

1. A bicycle frame comprising a plurality of structural elongate tubular members including a structural elongate first tubular member, the first tubular member extending about a longitudinal, the first tubular member having an elongate storage forming portion extending along the longitudinal from a first end of the storage forming portion to a second end of the storage forming portion, the first tubular member having an elongate first adjacent portion adjacent to the first end of the storage forming portion, the first adjacent portion extending along the longitudinal away from the storage forming portion from a first end of the first adjacent portion to a second end of the first adjacent portion, the first end of the storage forming portion merging into the first adjacent portion at the first end of the first adjacent portion, an exterior profile of the storage forming portion in cross section normal to the longitudinal being of reduced cross sectional area as compared to an exterior profile of first adjacent portion of the first tubular member in cross section normal to the longitudinal, a cover member removably coupled to the first tubular member over the storage forming portion and providing between the storage forming portion and the cover member a storage compartment, the combination of the storage forming portion with the cover member coupled thereto having an exterior profile in cross section normal to the longitudinal.

2. The bicycle frame as claimed in claim 1 wherein the exterior profile of the combination of the storage forming portion with the cover member coupled thereto smoothly merging with the exterior profile of the first adjacent portion of the first tubular member.

3. The bicycle frame as claimed in claim 1 wherein the exterior profile of the combination of the storage forming portion with the cover member coupled thereto is a complementary shape in cross section normal to the longitudinal to a shape of the exterior profile of the first adjacent portion.

4. The bicycle frame as claimed in claim 1 wherein the exterior profile of the combination of the storage forming portion with the cover member coupled having an average cross sectional area over its length as measured in cross section normal to the longitudinal thereto that is equal to or greater than the cross sectional area in cross section normal to the longitudinal of the exterior profile of the first adjacent portion.

5. A bicycle frame as claimed in claim 1 wherein the exterior profile of the first adjacent portion as seen in cross-sections normal the longitudinal along the longitudinal over the first adjacent portion has an exterior shape which is substantially unchanged or gradually changes along the longitudinal over the first adjacent portion, the exterior profile of the combination of the storage forming portion with the cover member coupled thereto has an exterior shape which is substantially the same as or gradually changes from the exterior shape of the first adjacent portion.

6. The bicycle frame as claimed in claim 5 wherein the cover member coupled to the storage forming portion extending longitudinally thereon and centered between two lateral sides of the first tubular member.

7. The bicycle frame as claimed in claim 1 wherein the tubular members are engaged end to end to form a loop, the cover member coupled to the storage forming portion on a side of the first tubular member selected from a side directed inwardly into the loop and a side directed outwardly from the loop.

8. The bicycle frame as claimed in claim 1 wherein the exterior profile of the first adjacent portion as seen in cross-sections normal the longitudinal along the longitudinal over the first adjacent portion has an exterior shape which is oval, the exterior profile of the combination of the storage forming portion with the cover member coupled thereto has an exterior shape which is oval.

9. The bicycle frame as claimed in claim 8 wherein the oval shape is a teardrop shape having an enlarged rounded forward end and a reduced size rear end.

10. The bicycle frame as claimed in claim 1 wherein the structural elongate tubular members include a down tube, a head tube, a top tube and a seat tube;
wherein the first tubular member is selected from the down tube, the had tube, the top tube and the seat tube, wherein:
when the first tubular member is the head tube, the cover member is rearward from the head tube with the head tube forming a front portion of an oval shape and the cover member forming a rear portion of the oval shape;
when the first tubular member is the seat tube, and the cover member is either is forward from the seat tube or rearward from the seat tube; and
when the first tubular member is the top tube, the cover member is either upward from the top tube or downward from the top tube.

11. The bicycle frame as claimed in claim 10 wherein the first tubular member is the down tube, the cover member bridges between the down tube and seat tube, the down tube forms a front portion of the oval shape, the seat tube forms a rear portion of the oval shape and the cover member forms a middle portion of the oval shape.

12. The bicycle frame as claimed in claim 10 wherein the first tubular member is the head tube, the cover member bridges between the down tube and top tube, the down tube and the head tube forms the a front portion of the oval shape, and the cover member forms a rear portion of the oval shape.

13. The bicycle frame as claimed in claim 10 wherein the first tubular member is the seat tube, the cover member bridges between the top tube and seat tube, the cover forms a front portion of the oval shape, and the seat tube forms a rear portion of the oval shape.

14. The bicycle frame as claimed in claim 1 wherein the first tubular member having an elongate second adjacent portion adjacent to the second end of the storage forming portion, the second adjacent portion extending along the longitudinal away from the storage forming portion from a first end of the second adjacent portion to a second end of the second adjacent portion, the storage forming portion at the second end of the storage forming portion merging along the longitudinal into the second adjacent portion at the first end of the second adjacent portion,
an exterior profile of the storage forming portion in cross section normal to the longitudinal being of reduced cross sectional area as compared to an exterior profile of second adjacent portion of the first tubular member in cross section normal to the longitudinal.

15. The bicycle frame as claimed in claim 14 wherein the exterior profile of the combination of the storage forming portion with the cover member coupled thereto smoothly merging with the exterior profile of the second adjacent portion of the first tubular member.

16. The bicycle frame as claimed in claim 14 wherein the exterior profile of the combination of the storage forming portion with the cover member coupled thereto is a complementary shape in cross section normal to the longitudinal to a shape of the exterior profile of the first adjacent portion and the second adjacent portion.

17. The bicycle frame as claimed in claim 14 wherein the exterior profile of the combination of the storage forming portion with the cover member coupled having an average cross sectional area over its length as measured in cross section normal to the longitudinal thereto that is equal to or greater than the cross sectional area in cross section normal to the longitudinal of the exterior profile of the first adjacent portion and the second adjacent portion.

18. The bicycle frame as claimed in claim 14 wherein
the exterior profile of the first adjacent portion as seen in cross-sections normal the longitudinal along the longitudinal over the first adjacent portion has an exterior shape which is substantially unchanged or gradually changes along the longitudinal over the first adjacent portion
the exterior profile of the second adjacent portion as seen in cross-sections normal the longitudinal along the longitudinal over the second adjacent portion has an exterior shape which is substantially unchanged or gradually changes along the longitudinal over the second adjacent portion,
the exterior profile of the combination of the storage forming portion with the cover member coupled thereto has an exterior shape which is substantially the same as or gradually changes from the exterior shape of the first adjacent portion and the second adjacent portion.

19. A bicycle frame comprising a plurality of elongate tubular members engaged end to end to form a loop,
each tubular members extending along a respective longitudinal axis,
each tubular members having oppositely directed sides comprising a right hand lateral side and a left hand lateral side and oppositely directed sides comprising inwardly directed side directed inwardly into the loop and an outwardly directed side directed outwardly from the loop
a slot provided laterally through at least one of the tubular members from the right hand lateral side to the left hand lateral side and open to the inwardly directed side of the at least one of the tubular members creating a storage forming portion,
a cover member removably coupled to the at least one first tubular member over the storage forming portion to define between the storage forming portion and the cover member a storage compartment.

20. The bicycle frame as claimed in claim 14 wherein the tubular members are engaged end to end to form a loop, the cover member coupled to the storage forming portion on a side of the first tubular member selected from a side directed inwardly into the loop and a side directed outwardly from the loop, the structural elongate tubular members include a down tube, a head tube, a top tube and a seat tube;

the first tubular member is selected from the down tube, the head tube, the top tube and the seat tube, wherein:

when the first tubular member is the head tube, the cover member is rearward from the head tube with the head tube forming a front portion of an oval shape and the cover member forming a rear portion of the oval shape;

when the first tubular member is the seat tube, and the cover member is either is forward from the seat tube or rearward from the seat tube; and when the first tubular member is the top tube, the cover member is either upward from the top tube or downward from the top tube.

* * * * *